United States Patent
Singer et al.

(10) Patent No.: US 6,202,625 B1
(45) Date of Patent: Mar. 20, 2001

(54) DRIVING DEVICE FOR A MOTOR SCYTHE

(75) Inventors: Andreas Singer, Fraureuth; Jochen Schoenhaar; Torsten Haussner, both of Hamburg, all of (DE)

(73) Assignee: Dolmar GmbH, Hamburg (DE)

( * ) Notice: Subject to any disclaimer, the term of this patent is extended or adjusted under 35 U.S.C. 154(b) by 0 days.

(21) Appl. No.: 09/319,814

(22) PCT Filed: Dec. 19, 1997

(86) PCT No.: PCT/EP97/07176

§ 371 Date: Jun. 11, 1999

§ 102(e) Date: Jun. 11, 1999

(87) PCT Pub. No.: WO98/29652

PCT Pub. Date: Jul. 9, 1998

(30) Foreign Application Priority Data

Dec. 27, 1996 (DE) .............................. 196 54 286

(51) Int. Cl.⁷ ..................................... F02B 5/00
(52) U.S. Cl. ........................ 123/305; 123/185.1
(58) Field of Search .................. 123/509, 298, 123/305, 73 C, 195 C, 198 E, 185.1

(56) References Cited

U.S. PATENT DOCUMENTS

| | | |
|---|---|---|
| 4,738,327 | 4/1988 | Takei . |
| 4,759,128 | 7/1988 | Katoh et al. ............... 30/276 |
| 4,779,581 | 10/1988 | Maier ................... 123/73 A |
| 5,438,968 | * 8/1995 | Johnson et al. ............ 123/509 |

FOREIGN PATENT DOCUMENTS

| | | | |
|---|---|---|---|
| 11 57 438 | 11/1963 | (DE) . | |
| 30 23 628 | 1/1981 | (DE) . | |
| 36 29 039 A1 | 3/1988 | (DE) . | |
| 37 35 711 A1 | 5/1989 | (DE) . | |
| 38 08 635 A1 | 9/1989 | (DE) . | |
| 0 590 362 A1 | 4/1994 | (DE) . | |
| 0 440 401 A1 | 8/1991 | (EP) | F02B/75/16 |
| 0 661 431 A2 | 7/1995 | (EP) | F02D/41/14 |
| 2 587 582 | 3/1987 | (FR) | A01D/34/68 |
| 52-59219 | 5/1977 | (JP) . | |
| 08-093599 | 4/1996 | (JP) . | |

* cited by examiner

*Primary Examiner*—Thomas N. Moulis
(74) *Attorney, Agent, or Firm*—McCormick, Paulding & Huber LLP

(57) ABSTRACT

The invention relates to a driving device for a motor driven vegetation cutter or the like with a two cycle engine showing an injection valve (12), a coupling placed in a coupling box (15), air intake and air blow-off devices, a fuel pump (17), a starter box (18) as well as eventual other additional sets. It is proposed so as to create a compact arrangement of the parts of said driving device with an optimal cooling and combustion to place the coupling box (15) and the starter box (18) on opposed sides of the two cycle engine and to direct the injection valve (12) with its jet direction onto the cylinder head or the ignition plug (11).

7 Claims, 1 Drawing Sheet

DRIVING DEVICE FOR A MOTOR SCYTHE

FIELD OF THE INVENTION

The invention relates to a driving device for a motor driven vegetation cutter, or the like, such as a lawn mower, grass or weed trimmer, hedge clipper or leaf blower, with a two cycle engine having a fuel injection valve, an output coupling placed in a coupling box, cooling air intake and discharge devices, a fuel pump, and a starter housing, as well as possible other additional components.

PRIOR ART

For motor driven vegetation cutters, it has been proved to be advantageous to use a combustion engine as the driving gear. Hereby an improvement, i.e. a reduction of the pollutant emission is obtained, while maintaining or neutralizing the power. Simultaneously, the use of fuel injection results in a compact construction and a reduction of weight. However, the use of fuel injection also leads to quite special problems.

For driving devices for motor driven vegetation cutters known by the prior art, the driving gear is so adjusted that the axis of the crankshaft is placed linearly to the main shaft or the main pipe, and thus to the power take-off. The fan wheel and the output coupling are driven directly by a crankshaft and lie on the power take-off side of the motor unit. The cooling air is sucked generally from below the crankcase which is placed under the motor unit and is discharged in a plane above the axis of the crankshaft where it flows over the motor unit which has bulkheads serving for the air conduction.

Motor driven vegetation cutters should, as hand-held equipment, have a compact construction especially in the area of the driving device and their weight should be as low as possible. This is partially contrary to an optimal cooling which is still significant for the motor life, even if not necessary for operation. An optimal combustion through adequate air-fuel conduction and an optimal ignition are equally desirable.

SUMMARY OF THE INVENTION

Thus, it is an object of this invention to improve the above stated driving device with regard to compact construction and to configure it so as to obtain optimal motive functions, whereby an optimal cooling of the temperature sensitive parts of the driving device can simultaneously be maintained.

The aim of the invention is reached by way of a driving device having a cylinder with a fuel injection valve, an output coupling in a coupling box, cooling air intake and discharge devices, a fuel pump and a starter box, wherein the output coupling box and the starter box are placed on opposite sides of the cylinder longitudinal axis and the injection valve is set with its jet directed onto the cylinder head. An arrangement of the fuel injection valve above the starter box fully exploits the relatively big existing space. Since the injection valve is not placed parallel to the ignition plug longitudinal axis with regard to its longitudinal axis orientation, the overall height of the whole driving device can still be minimized. Furthermore, the fuel is directed in the direction of the ignition plug by the jet direction, whereby the combustion can be optimalized.

The nozzle opening of the fuel injection valve is preferably placed above or in the upper area of a transfer port (of the two cycle engine).

The coupling box and a cooling air fan wheel are placed the one near the other directly on the crankshaft on the power take-off side of the cylinder, while the starter box is placed on a tail shaft on the opposite side of the cylinder, and the fuel pump, which is also directly driven by the crankshaft, is placed between the starter box and the crankcase placed below the engine unit. The arrangement of the fuel pump provides the advantage that the cooling air which flows along under the crankcase also flows around the pump case, which is getting warmer when in operation, and cools this pump case. Moreover, by means of the arrangement of the fuel pump on the same side of the cylinder as the injection valve, a short fuel supply line to the injection valve can be provided.

For the function control, according to another embodiment of the invention, the fuel injection valve is connected to an electronic control unit which is preferably placed above or in the upper area of the driving device, near a combustion air intake casing which has the advantage of short connecting lines to the sensors for the temperature and operating status registration. There is another cooling effect by the flowing combustion intake air if the control device is located in the corresponding intake area of the intake casing.

BRIEF DESCRIPTION OF THE DRAWINGS

An embodiment of the driving device according to the invention is represented in the drawings.

DETAILED DESCRIPTION OF PREFERRED EMBODIMENT

Figure 1:
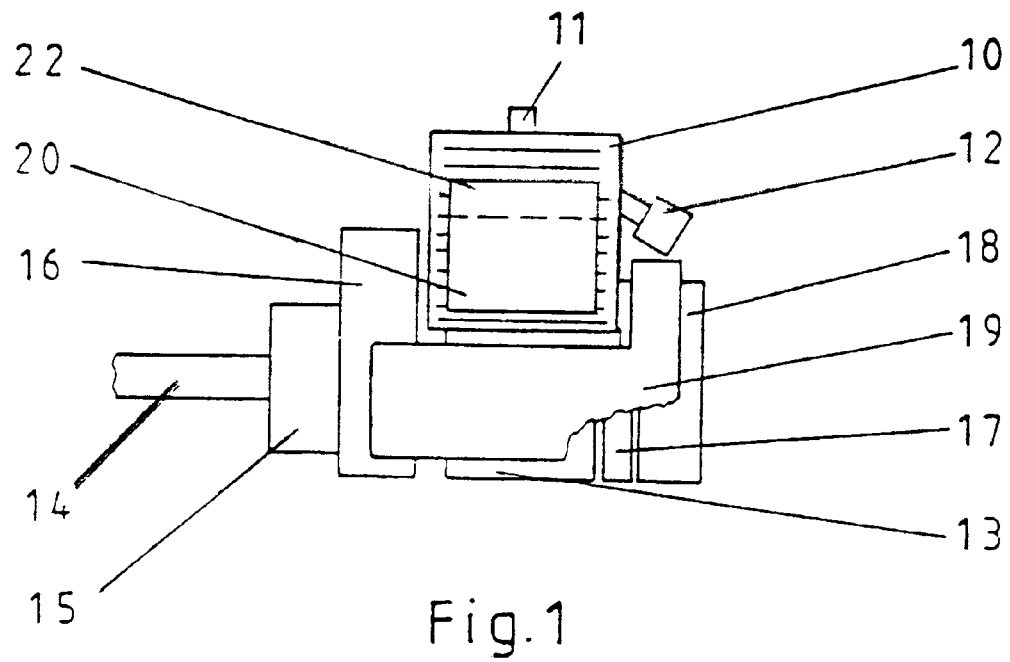
FIG. 1 is a schematic side view of a driving device.
Figure 2:
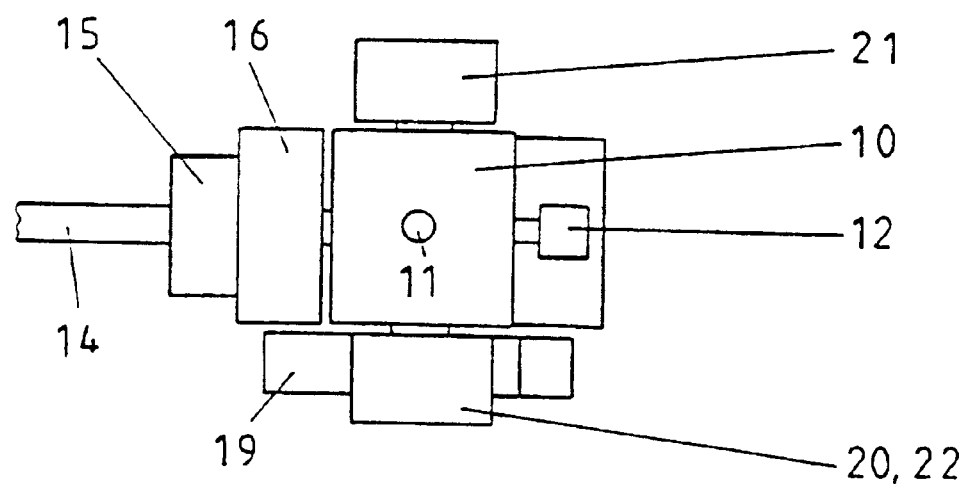
FIG. 2 is a top view of this driving device.

The essential parts of the driving device which may be seen on FIGS. 1 and 2 are the two cycle engine with the cylinder 10, the ignition plug 11 and the fuel injection valve 12. Below the cylinder 10, there is the crankcase 13 containing the crankshaft which at one end projects from the power take-off side of the cylinder and at its opposite end has a tail shaft portion. On the power take-off side of the cylinder, a coupling box 15 as well as a fan casing 16 with a fan wheel is placed on the crankshaft, while the fuel pump 17 is placed on the opposite side and at the end the starter box 18. The coupling box 15 contains an output coupling which connects the crankshaft to a driven shaft 14. According to the invention, the fuel injection valve 12 is above the starter box and is set, with an oblique position which can be seen on FIG. 1, such that the jet is directed onto the cylinder head. The tank 19 as well as the intake casing 20 for the cooling air are superimposed on the same side, whereas the exhaust gas discharge device 21 (see FIG. 2) is placed on the opposite side.

Due to the arrangement of the starter box 18 on the opposite side of the cylinder from the power take-off, because of the low overall height with respect to the fan casing 16, a space is provided which can be used for the chosen arrangement and position of the injection valve. As may be seen on FIGS. 1 and 2, all represented parts of the driving device can be arranged compactly around the cylinder 10. This also applies to the control unit 22 which is placed in the casing in the upper part of the combustion air intake casing 20 so that the air which is intaken there can be used for the cooling of the control casing 22.

In the claims:

1. A driving device for a motor vegetation cutter, said driving device comprising:

a cylinder (10) having a cylinder head and a fuel injection valve (12), a crankshaft, an ignition plug (11), an output coupling placed in a coupling box (15), cooling air intake and discharge devices (16, 20, 21), a fuel pump (17), and a starter box (18), wherein the output coupling box (15) and the starter box (18) are both received on the crankshaft and lay on opposite sides of a longitudinal axis of the cylinder (10), and the injection valve (12) has its jet directed onto the cylinder head or the ignition plug (11).

2. A driving device according to claim 1, wherein the injection valve (12) has a nozzle opening which is placed above or in the upper part of a transfer port.

3. A driving device according to claim 1, wherein the coupling box (15) and a fan (16) on the crankshaft are placed the one near the other on the same side of the cylinder.

4. A driving device according to claim 1, wherein the fuel pump (17) and the starter box (18) are placed on a tail shaft portion of the crankshaft.

5. A driving device according to claim 1, wherein the fuel pump (17) is driven directly by the crankshaft.

6. A driving device according to claim 1, wherein the injection valve (12) is connected to an electronic control unit (22) which is placed above or near a combustion air intake casing (20).

7. A driving device according to claim 6, wherein the control unit (22) is placed so as to be encountered by the incoming air taken in by the combustion air intake casing (20).

* * * * *